United States Patent
Kakade et al.

(10) Patent No.: US 10,393,595 B2
(45) Date of Patent: Aug. 27, 2019

(54) ESTIMATING A CABIN TEMPERATURE OF A VEHICLE

(71) Applicant: GM GLOBAL TECHNOLOGY OPERATIONS LLC, Detroit, MI (US)

(72) Inventors: Rupesh S. Kakade, Sterling Heights, MI (US); Todd M. Tumas, Taylor, MI (US); Robert D. Taft, Perry, MI (US); Andreas Gombert, Frankfurt (DE); Milan Prakash, Karnataka (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 305 days.

(21) Appl. No.: 15/405,029

(22) Filed: Jan. 12, 2017

(65) Prior Publication Data

US 2018/0195911 A1 Jul. 12, 2018

(51) Int. Cl.
*G01K 13/02* (2006.01)
*B60H 1/00* (2006.01)

(52) U.S. Cl.
CPC ............ *G01K 13/02* (2013.01); *B60H 1/0075* (2013.01); *B60H 1/00792* (2013.01); *B60H 1/00807* (2013.01); *G01K 2201/02* (2013.01)

(58) Field of Classification Search
CPC .................................................. G01K 13/02
See application file for complete search history.

(56) References Cited

U.S. PATENT DOCUMENTS

| | | | | |
|---|---|---|---|---|
| 2004/0164171 | A1* | 8/2004 | Eisenhour | B60H 1/00064 236/49.3 |
| 2005/0199735 | A1* | 9/2005 | Eisenhour | B60H 1/00735 236/1 C |
| 2010/0187211 | A1* | 7/2010 | Eisenhour | B60H 1/00742 219/202 |
| 2012/0297809 | A1* | 11/2012 | Carpenter | B60L 1/003 62/244 |
| 2017/0282738 | A1* | 10/2017 | Miller | B60L 1/02 |

* cited by examiner

*Primary Examiner* — Manuel A Rivera Vargas
(74) *Attorney, Agent, or Firm* — Lorenz & Kopf LLP (57) ABSTRACT

Methods and systems are provided for estimating a temperature of a cabin of a vehicle and using the estimated cabin temperature. The methods and systems obtain, via at least one temperature sensor, a surface temperature of at least a first internal surface of the cabin of the vehicle. The methods and systems estimate, via a processor and using at least the obtained surface temperature, the heat transfer from the at least one surface to cabin air within the cabin. The methods and systems estimate, via a processor and using at least the estimated heat transfer, the cabin temperature of the vehicle. The methods and systems use the estimated cabin temperature of the vehicle to control at least one feature of an air conditioning module of the vehicle.

20 Claims, 3 Drawing Sheets

ESTIMATING A CABIN TEMPERATURE OF A VEHICLE

TECHNICAL FIELD

The technical field generally relates to estimating a cabin temperature of a vehicle, and more particularly controlling a feature of a climate control systems based on the estimated cabin temperature.

BACKGROUND

A typical automotive vehicle with an automatic climate control system includes an in-car temperature sensor. Measurements from the sensor are used by the automatic climate control system as an input to control the temperature within the vehicle cabin. The climate control system determines at least the appropriate discharge air temperature for achieving a desired cabin temperature. However, due to factors such as air stratification, heat storage in the instrument panel, and discharge from nearby HVAC vents, the temperature measurement from the in-car temperature sensor can vary significantly from the true cabin temperature. The temperature measured by the in-car temperature sensor may be as much as ten degrees Celsius different from the air temperature at a breath level (i.e., air temperature adjacent to the driver's face). An automatic climate control system which is responsive to the temperature sensor may therefore overheat or overcool the cabin. Also, this overheating or overcooling can be exacerbated over time as the control algorithm being used fails to track the true cabin temperature.

Accordingly, it is desirable to provide an accurate method or apparatus for estimating the cabin temperature. In addition, it is desirable to provide a method or apparatus which provides real-time corrections to the estimation of the cabin temperature. In addition, it is desirable to provide a method or apparatus for estimating the cabin temperature which eliminates the requirement for a cabin air temperature sensor. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for estimating the cabin temperature of a vehicle and using the estimated cabin temperature in a climate control system.

In one embodiment, there is provided a computer implemented method of estimating a temperature of a cabin of a vehicle and using the estimated cabin temperature. The method includes the steps of: obtaining, via at least one temperature sensor, a surface temperature of at least a first internal surface of the cabin of the vehicle; estimating, via a processor and using at least the obtained surface temperature, the heat transfer from the at least one surface to cabin air within the cabin; estimating, via a processor and using at least the estimated heat transfer, the cabin temperature of the vehicle; using the estimated cabin temperature of the vehicle to control at least one feature of a climate control system of the vehicle.

In another embodiment, there is provided a system for estimating the cabin temperature of a vehicle and using the estimated cabin temperature, the system comprising: a non-transitory computer readable medium comprising: a first module configured to obtain, via at least one temperature sensor, a surface temperature of at least one internal surface of the cabin of the vehicle; a second module configured to estimate, via a processor and using at least the obtained surface temperature, the heat transfer from the at least one surface to cabin air within the cabin; a third module configured to estimate, via a processor and using at least the estimated heat transfer, the cabin temperature of the vehicle; and a fourth module configured to use the estimated cabin temperature of the vehicle to control at least one feature of a climate control system of the vehicle.

In another embodiment, there is provided a vehicle adapted to estimate a temperature of a cabin of the vehicle and use the estimated cabin temperature, the vehicle comprising: a non-transitory computer readable medium comprising: a first module adapted to obtain, via a processor, a surface temperature of at least one internal surface of the cabin of the vehicle; a second module adapted to estimate, via a processor and using at least the obtained surface temperature, the heat transfer from the at least one surface to cabin air within the cabin; a third module adapted to estimate, via a processor and using at least the estimated heat transfer, the cabin temperature of the vehicle; and a fourth module configured to use the estimated cabin temperature of the vehicle to control at least one feature of a climate control system of the vehicle.

DESCRIPTION OF THE DRAWINGS

The exemplary embodiments will hereinafter be described in conjunction with the following drawing FIG.s, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of control systems, and that the vehicle system described herein is merely one example embodiment.

For the sake of brevity, conventional techniques related to signal processing, data transmission, signaling, control, and other functional aspects of the systems (and the individual operating components of the systems) may not be described in detail herein. Furthermore, the connecting lines shown in the various FIG.s contained herein are intended to represent example functional relationships and/or physical couplings between the various elements. It should be noted that many alternative or additional functional relationships or physical connections may be present in various embodiments.

Figure 1:
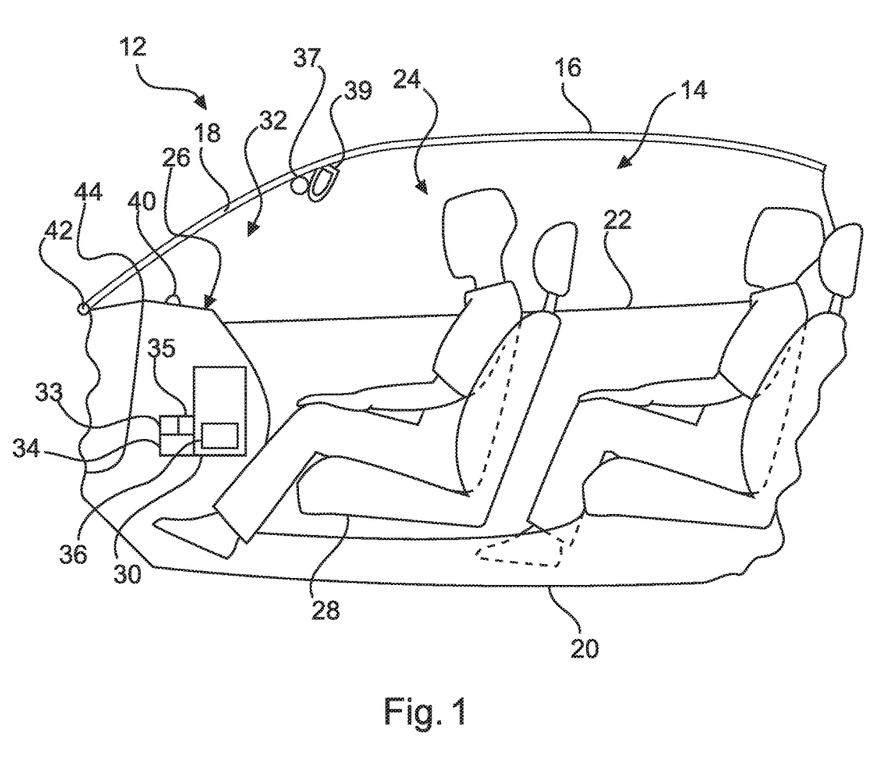
FIG. 1 is a side view of a portion of a vehicle in accordance with an embodiment.

With reference now to FIG. 1, a vehicle 12 is shown to include an automatic climate control system 32 in accordance with various embodiments. Although the FIGS shown herein depict an example with certain arrangements of elements, additional intervening elements, devices, features, or components may be present in actual embodiments. It should also be understood that FIG. 1 is merely illustrative and may not be drawn to scale.

As shown, the vehicle 12 includes at least one controller 34. The controller 34 is further described herein as being dedicated to automatic climate control, e.g. a HVAC controller 34. However, the controller 34 may have more extensive functionality relating to control of the vehicle 12. For example, the controller 34 may control one or more components of the vehicle 12. The components may be associated with autonomous or semi-autonomous systems of the vehicle 12. For example, the controller 34 may control vehicle components of a braking system (not shown), a steering system (not shown), and/or a chassis system (not shown) of the vehicle 12 each of which may be autonomously controlled (e.g., without driver input) and/or semi-autonomously controlled (e.g., with some driver input).

In various embodiments, the controller 34 includes at least one processor 33 and memory 35. The memory 35 stores instructions that can be performed by the processor 33 including the automatic climate control and temperature estimation methods described herein with respect to FIGS. 1 to 3. The instructions stored in memory 35 may include one or more separate programs, each of which comprises an ordered listing of executable instructions for implementing logical functions.

When the controller 34 is in operation, the processor 33 is configured to execute the instructions stored within the memory 35, to communicate data to and from the memory 35, and to generally control operations of the vehicle 12 pursuant to the instructions. The processor 33 can be any custom made or commercially available processor, a central processing unit (CPU), an auxiliary processor among several processors associated with the control module 30, a semiconductor based microprocessor (in the form of a microchip or chip set), a macroprocessor, or generally any device for executing instructions.

In various embodiments, the processor 33 executes the instructions of the automatic climate control system 32. In general, the automatic climate control system 32 is configured to estimate a cabin temperature of the vehicle 12 and use the estimated cabin to control at least one feature of the climate control system 32. The cabin temperature estimation may be based on solving a heat balance equation with terms for heat flow by convention to an interior cabin 14 of the vehicle 12 and optionally at least one of heat flow from a heating, ventilating and cooling, HVAC, module 30 and heat generated by one or more occupants of the vehicle 12, as described further below. The automatic climate control system 32 may use the cabin temperature estimation as an input for controlling one or more air conditioning settings (e.g. air flow rate, temperature, etc.).

With reference now to FIG. 1, a portion of a vehicle 12 is shown. The vehicle 12 includes a passenger compartment or cabin 14 which is enclosed by a roof 16, a windshield 18, a floor 20, and doors 22 with windows 24. The windows 24 may include, for example, front left, front right, rear left and rear right windows 24. An instrument panel 26 is located in front of the driver seat 28. A HVAC module 30 (or air conditioning unit), which is part of an automatic climate control system 32, is located behind the instrument panel 26. A blower 36 is fluidly connected to the HVAC module 30 to cause air flow through the module 30. The HVAC module 30 includes a HVAC controller 34 which includes the processor 33 and the memory 35.

The automatic climate control system 32 includes one or more temperature sensors for obtaining a temperature a surface of the vehicle 12. The one or more temperature sensors may be implemented by a thermistor, an infrared sensor or some other temperature sensor. The one or more temperature sensors may be mounted to the instrument panel 26 or the windshield 18 or elsewhere to allow surface temperature measurements to be obtained. In one embodiment, a solar load sensor 40 is included, which may be mounted on a top surface 44 of the instrument panel 26 to measure the temperature at this location as well as the intensity and optionally an angle of solar load. In various embodiments, the climate control system 32 includes an ambient air temperature sensor 42 that measures the ambient air temperature outside of the vehicle 12. In various embodiments, the climate control system 32 includes a windshield temperature sensor 37. The windshield temperature sensor 37 may be included in a Relative Humidity Sensor, RHS, located on the cabin side of the windshield 18 behind the rearview mirror 39. The one or more temperature sensors are in communication with the HVAC controller 34.

Figure 2:
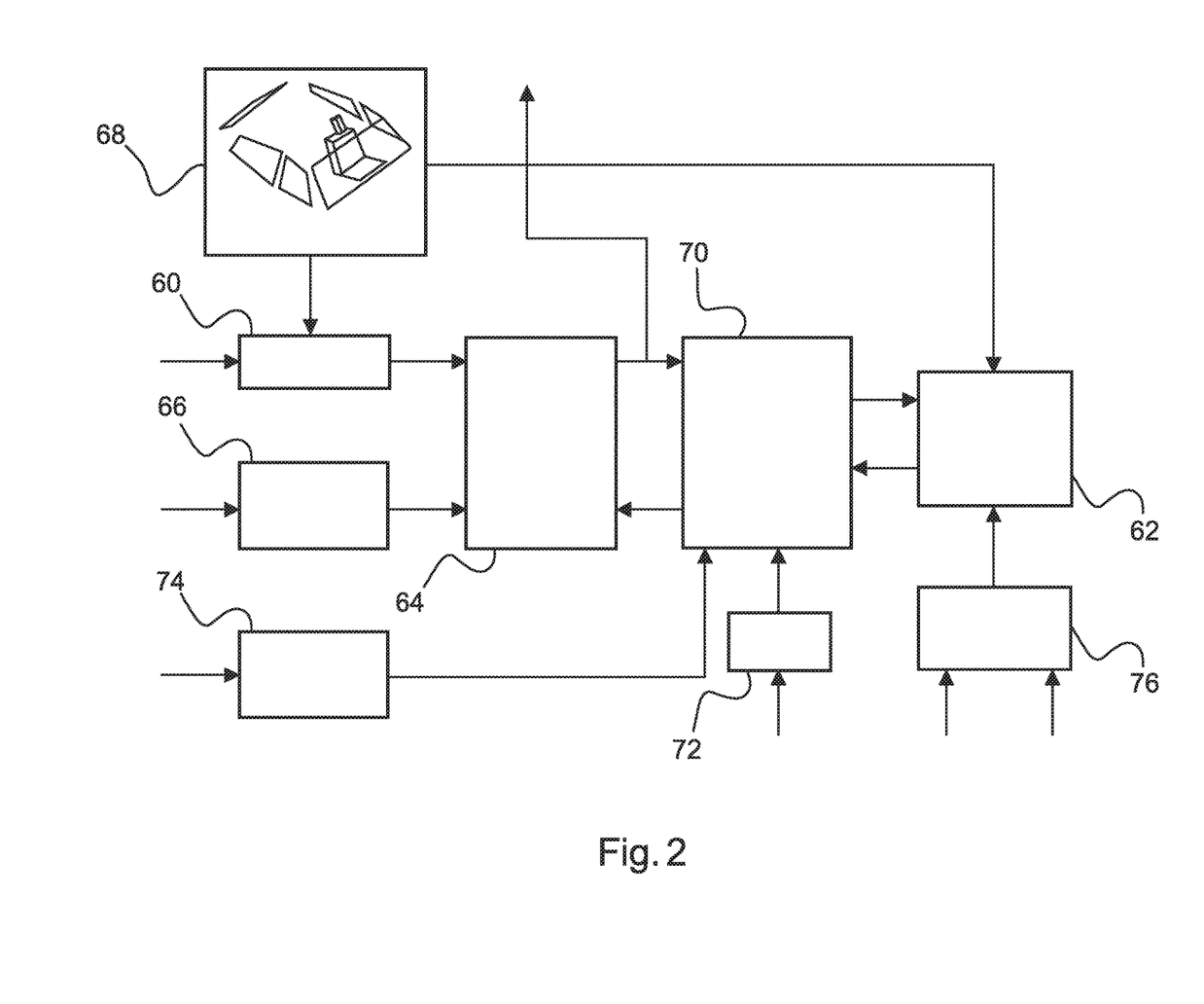
FIG. 2 is a diagram of a control module system in accordance with an embodiment.

FIG. 2 shows an embodiment of a control module system that is, in various embodiments, implemented by the processor 33 and the memory 35 of the HVAC controller 34 in order to achieve the estimate of cabin temperature and subsequent use thereof. The HVAC controller 34 is configured to estimate the cabin temperature of the vehicle 12. To achieve this, a cabin air temperature module 62 is provided, which may output a breath air temperature estimate. The cabin air temperature module 62 is configured to output the estimate of cabin temperature, which may be cabin air temperature at the breath level of a vehicle occupant or at feet level or at some other location.

The cabin air temperature module 62 is configured to solve a heat balance equation including terms representing heat transfer from the HVAC module 30 and heat transfer by convection from interior surfaces of the cabin 14. The major interior surfaces of the cabin 14 can include an interior surface of any one or more of: the roof 16, the windshield 18, the floor 20, the doors 22, the windows 24, the instrument panel 26 etc., as will be described further below.

The heat balance equation may also include a term representing heat generated by one or more vehicle occupants. The number of vehicle occupants may be assumed or determined based on an input from, for example, a seat belt sensor (or other means) indicating when a seat belt has been fastened.

The heat balance equation may take the form of:

$$Q\_in - Q\_out + Q\_generated = \delta Q$$

where (Q_in−Q_out) represents the net heat transfer to the cabin interior, Q_generated represents the heat added by occupants and $\delta Q$ represents the change in thermal energy of the cabin interior.

The net heat transfer to the cabin interior may be determined based on heat transfer by convection between the interior surfaces and air in the cabin 14 and heat transferred by the HVAC module 30.

In the exemplary embodiment of FIG. 2, the heat transfer by convection is determined by an interior convection module 70, as will be explained more fully below. For example, the interior convention module 70 uses as inputs at least the surface temperatures of the interior surfaces as determined by the surface temperature module 64 and heat transfer coefficients, which may be stored in memory 35. The heat transfer coefficients may be selected based on at least one of: one or more settings of the HVAC module 30, such as air flow rate and air distribution mode, and vehicle speed.

In the example shown in FIG. 2, the heat transfer by the HVAC module 30 is determined by a discharge air energy module 76, which will be described further below. The discharge air energy module 76 may determine the heat transfer to the cabin 14 by the HVAC module 30 using at least one of air flow rate and air temperature outlet by the blower 36.

In the example of FIG. 2, the surface temperature module 64 is configured to determine surface temperatures of interior surfaces of the cabin 14 using at least one of one or more solar load values from a solar load module 60, outside air temperature from the ambient temperature sensor 42, and one or more corrected temperature values from a sensor offset correction module 66. The sensor offset correction module 66 is configured to correct for any contamination in the outputs from one or more of the temperature sensors 37, 40 described above.

In various embodiments, the HVAC controller 34, specifically the surface temperature module 64 thereof, obtains a surface temperature of at least a first internal surface of the cabin 14 based on readings from one or more of the temperature sensors 37, 40, 42 described above. In various embodiments, the at least a first internal surface of the cabin 14 includes the top surface 44 of the instrument panel 26. In various embodiments, the at least a first internal surface of the cabin 14 includes the interior surface of the windshield 18.

The surface temperature module 64 is configured to correlate the sensed temperature of at least a first internal surface of the cabin 14 with one or more other (or second) interior surfaces. The other interior surface temperatures may be obtained by using linear correlations to the real-time, optionally corrected, data from one or more sensors 37, 40, 42 described above or other temperature sensing devices. For example, surface of the body elements of the cabin 14, windows 24, windshield 18 or rear screen (not shown) use linear correlation to the temperature measured by the solar sensor 40. In this example, vehicle glasses (e.g. windshield 18, rear screen and windows 24) use linear correlation to the windshield temperature measured by the windshield temperature sensor 37. The linear correlation process uses the sensed temperature and other parameters, such as solar load information, as described in further detail below. In vehicles without the windshield temperature sensor 37, temperature of the vehicle glasses uses linear correlation to the ambient temperature sensor 42.

In order to obtain the at least a first internal surface temperature of the cabin 14, in various embodiments, the HVAC controller 34 receives the temperature measurement from, for example, the solar load sensor 40 for use in estimating the interior surface temperature of the instrument panel 26. Although at the correct location, under certain circumstances, this measurement can vary to some extent from the true temperature of the top surface 44. For instance, the solar load sensor 40 may be located near to a defrost outlet and so be relatively cooler when defrosting is active or in the event of leakage from the defrost outlet. As another example, the solar load sensor 40 may require for correction of absorption of solar radiation by the top surface 44 of the instrument panel 26. Therefore, a correction or offset may be made to the measurements from the solar load sensor 40. The correction or offset may be performed by the sensor offset correction module 66. Correction values can be obtained from experimentation and are stored in the memory 35 of the HVAC controller 34. The correction values may be looked up and determined based on at least one of defrost flow rate from the HVAC module 30 and solar intensity.

In order to determine at least a first internal surface temperature of the cabin 14, in various additional or alternative embodiments, the HVAC controller 34 receives the temperature measurement from the windshield temperature sensor 37 for use in estimating the interior surface temperature of the windshield 18. Due to absorption of solar radiation by the windshield temperature sensor 37 a correction for a more accurate estimate of the interior surface temperature of the windshield 18 may be required. The correction or offset may be performed by the sensor offset correction module 66. Correction values can be obtained from experimentation and are stored in the memory 35 of the HVAC controller 34. The correction values may be looked up and determined based on at least one of solar intensity.

The surface temperature module 64 is configured to estimate one or more other (second) interior surface temperatures. In one embodiment, sixteen surfaces are estimated and these include ten opaque surfaces (four doors, roof, engine firewall, dashboard, rear seats/boundary, parcel shelf and floor) and six transparent surfaces (four side glasses, windshield and rear screen). For each surface, the geometry, orientation, optical properties and material properties are known and are stored in the memory 35 of the HVAC controller 34. The angle of solar radiation relative to the respective surface can be determined using this data along with the solar load sensor data on the angle and intensity of solar radiation.

In various embodiments, the surface temperature control module 64 is configured to correlate the at least a first internal surface temperature of the cabin 14 to the one or more other interior surface temperatures using a determined heat transfer by the other interior surface by convection and a determined heat transfer by the other interior surface by solar absorption. In various embodiments, the surface temperature control module 64 is configured to correlate the interior surface temperature of the windshield 18, obtained as described above, to other transparent (e.g. glass) surfaces of the vehicle 12 such as the windows 24 and the rear screen (not shown). In various embodiments, the surface temperature control module 64 is configured to correlate the interior surface temperature of the top surface 44 of the instrument panel 26 to other interior opaque surfaces or interior body element surfaces such as the left side front door, the left side rear door, the right side front door, the right side rear door, the roof, the engine firewall (vertical part of dashboard), rear seats, the parcel Shelf (package shelf), and the floor. A correlation may also be performed for the windshield 18 and the top surface 44 of the instrument panel 26 or the corrected temperature values from the sensor offset correction module 66 may be used.

The correlation described above may be performed by the surface temperature module 64 based on the following equation for the transparent or glass interior surfaces:

$$Tg = Tb + Toffset$$

where Tg is the glass temperature estimate, Tb is a base temperature, and Toffset is the offset temperature obtained from an amount of heat exchanged by each glass with the surroundings (outside and inside the cabin 14). This correlation is performed for each glass to obtain an estimate of the interior surface of each glass.

Tb, the base temperature, may be the temperature of the interior surface of the windshield 18 obtained from the sensor offset correction module 66 or is otherwise based on a sensed temperature reading for the windshield, as described above. Alternatively, the base temperature, Tb, is taken from the ambient temperature sensor 42.

Toffset may be determined based on a convection heat transfer value for the glass interior surface from the interior convection module 70 and a solar heat transfer value from the solar load module 60, as described further below. Toffset may be determined based on both exterior and interior values for heat transfer by convection, i.e. heat transfer by convection to exterior of vehicle 12 and heat transfer by convection to interior of vehicle 12. Toffset is determined independently for each glass based on heat transfer values determined for that particular glass. In particular, net heat transfer (Qnet) that takes into account interior heat transfer by convection (Qconv, intr) and heat transfer by exterior convection (Qconv, intr) for the glass and heat transfer by solar radiation (Qsolar) may be used as an input for a look-up table to determine Toffset. The net heat transfer look-up value may be determined from the formula:

$$Qnet = Qconv, extr - Qconv, intr + Qsolar.$$

The correlation described above may be performed by the surface temperature module 64 based on the following equation for the opaque or body element interior surfaces:

$$Ts, intr = Tb + Toffset,$$

where Ts,intr is the interior surface temperature estimate of the body element, Tb is the base temperature equal to the temperature of the top surface 44 of the instrument panel 26 obtained from the sensor offset correction module 66 or is otherwise obtained based on a sensed temperature reading for the body element. Toffset is the offset temperature obtained from the exchange of heat between each interior surface and the surroundings. Exchange of heat includes heat transfer by convection and absorption of solar radiation. Convection heat transfer with the cabin interior air is considered. The interior surface temperature estimate is determined by the surface temperature module 64 for each surface with Toffset determined independently for each body element surface.

Toffset may be determined based on a convection heat transfer value for the body element interior surface from the interior convection module 70 and a solar heat transfer value for the body element from the solar load module 60, as described further below. In particular, net heat transfer (Qnet) that takes into account interior heat transfer by convection (Qconv, intr) for the body element and heat transfer by solar radiation (Qsolar) may be used as an input for a look-up table to determine Toffset. The net heat transfer look-up value may be determined from the formula: Qnet = Qsolar - Qconv, intr.

The solar load module 60 is configured to determine, surface by surface, the solar load on each of the interior surfaces. The solar load module 60 has as inputs physical cabin data from the physical cabin data module 68 and ambient solar radiation information in order to determine heat transfer by solar radiation for each of the interior surfaces. The physical cabin data may include glass orientation, surface areas and optical properties of the glasses including transmissivity and absorptivity to account for solar radiation. The ambient solar radiation information may include direction and intensity. The ambient solar radiation may be obtained from the solar load sensor 40, and optionally time and location information if available. The physical cabin data may be stored on memory 35 and accessed by the physical cabin data module 68.

Part of the solar radiation is transmitted through the vehicle glazing (windows 24, windshield 18 and rear screen) and is absorbed by the interior surfaces of body elements such as doors, dashboard, parcel shelf, etc. Vehicle glazing comprises those parts of the vehicle through which occupants are able to view the outside surroundings, as distinguishable vehicle body elements like door frames, flooring, roof, etc. Vehicle glazing is generally, but not exclusively, made of glass. Transmission of solar radiation depends on at least two factors including direct solar transmission property of the glasses and orientation of the glasses with respect to the sun (azimuth and elevation angles of the surface normal). Part of the solar radiation will be reflected and thus does not affect cabin temperature. A remaining part of the impinging solar radiation is absorbed partly by the glasses and partly by the body elements. Absorption of the solar radiation by the glasses depends on the absorptivity of the glasses.

The solar module 68 is configured to calculate absorbed solar radiation heat by the vehicle glazing using solar absorptivity of the glass obtained from the physical cabin data module, solar intensity and solar angle relative to the normal of the glass. The solar intensity may be obtained from the solar load sensor 40. The solar angle may also be determined from the solar load sensor 40 or from time and location information from a GPS module of the vehicle 12.

The solar module 68 is configured to calculate absorbed solar radiation heat by the interior surfaces of the body elements that are transmitted through the vehicle glazing. The body elements may include: the left side front door, the left side rear door, the right side front door, the right side rear door, the roof, the engine firewall (vertical part of the dashboard), the top surface 44 o the instrument panel 26 (horizontal part of the dashboard), the rear seats, the parcel shelf and the floor.

The solar load module 68 may be configured to utilize one or more matrices logically distributing the transmitted solar radiation to the cabin interior surfaces such that none of the transmitted solar radiation energy is lost from inside the cabin. The solar load module may calculate absorbed solar radiation heat by the interior surfaces of the body elements further by utilizing absorptivity of the respective interior surfaces and the solar angle. Any solar radiation energy reflected by the interior surfaces of the body elements may be considered to be absorbed equally by all of the interior surfaces of the body elements. The distribution of solar radiation and the solar absorptivity of the vehicle 12 may be obtained from the physical cabin data module 68.

The solar module 68 is configured to output the absorbed solar radiation heat by the interior surfaces of the body elements and the absorbed solar radiation heat by the vehicle glasses. The output corresponds to Qsolar for each of the surfaces as identified above. The surface temperature module 64 is configured to receive these absorbed heat values for use in determining the temperature of each of the interior surfaces of the glasses and the body elements as described above (e.g. for use in determining offset as described above).

The interior convection module 70 is configured to determine convection heat transfer per unit area from the interior surfaces of the cabin 14 to the interior air of the cabin 14 shall be obtained by multiplying the heat transfer coefficient for the interior surface of the shell elements including the glass and body elements of the vehicle 12 with the temperature difference obtained by subtracting the breath temperature estimate for the cabin (Tbreath,fl) from the interior surface temperature of the shell elements (Ts,intr). The interior convention module 70 may use the following equation:

$$Q\text{conv,intr} = hi \cdot J\_fl \cdot (Ts,\text{intr} - T\text{breath,fl}),$$

where hi is the heat transfer coefficient for the interior surface and Qconv,intr is the heat transfer per unit area required by the surface temperature module 64 for determining Toffset, as described above. The parameter J_fl is an optional constant representing heat flow distribution as obtained by experimentation.

The temperature of the interior surfaces Ts,intr is obtained by way of feedback from the surface temperature module 64 and is taken as the last calculated value for Ts,intr. The breath level temperature Tbreath,fl is obtained by way of feedback from the cabin air temperature module 62 and is taken as the last calculated value for Tbreath,fl. Although the breath level temperature has been used in this exemplary embodiment, it is envisaged that other cabin air temperatures from the cabin air temperature module 62 could be used.

The heat transfer coefficients for each interior surface is obtained from the HTC module 72. The heat transfer coefficients may be stored in a table in the memory 35. The table may be two or three dimensional. The two dimensional table may include heat transfer coefficients for each of the interior surfaces of the shell elements including the vehicle glasses and body elements, with different entries for each shell element depending upon an air distribution mode of the HVAC module 30. The three dimensional table may also include different heat transfer coefficients depending upon an air flow rate setting of the HVAC module 30. In embodiments, the heat transfer coefficients are obtained from Computational Fluid Dynamics (CFD) simulations.

The HTC module 72 is configured to return to the interior convention module 70 the heat transfer coefficients hi to the interior convection module based on at least one setting of the HVAC module 30 for use in determining Qconv,intr.

The interior convection module is further configured to determine convection heat transfer per unit area (Qconv, extr) from outside air to the vehicle glazing by multiplying the exterior heat transfer coefficient (he) with a temperature difference obtained by subtracting interior surface temperature of the glazing (Tg) from an input signal outside air temperature (OAT). This calculation will produce convection heat transfer with cabin exterior for each of the vehicle glasses.

$$Q\text{conv,extr} = he \cdot (OAT - Tg)$$

The glass temperature Tg may be obtained by feedback from the surface temperature module 64 as the last calculated value. The outside air temperature OAT is obtained based on an output of the ambient temperature sensor 42.

The exterior heat transfer coefficients are obtained from the HTC module 72. The HTC module may access the corresponding values for the heat transfer coefficient in the memory 35. The HTC module may return the exterior heat transfer coefficients based on vehicle speed. The exterior heat transfer coefficients are stored for each glass of the vehicle 12 in addition to different values therefor depending upon vehicle speed.

It is to be noticed that, unlike conventional methods, the method according to the present embodiment utilizes the fact that the vehicle manufacturer is aware of all the physical dimensions and material properties of the cabin 14. Also unlike conventional methods, this is used in numerical analysis to accurately predict heat flow.

The interior convection module 70 is configured to determine the heat transfer of the vehicle glasses by convection Qconv,extr, the heat transfer of each of the interior surfaces of the shell elements by convection Qconv,intr and return these heat transfer values to the surface temperature module 64. The solar load module 60 is configured to determine the heat radiation Qsolar for each of the interior surfaces of the shell elements and return this heat transfer value to the surface temperature module. From Qconv,extr, Qconv,intr and Qsolar, the surface temperature module 64 is able to determine net heat transfer Qnet for each of the surface elements and determine a temperature offset Toffset. The temperature offset is used by the surface temperature module 64 to determine the temperature Tg and Ts,intr for each of the interior surfaces of the vehicle 12.

The surface temperature module 64 is configured to output the determined temperatures Tg and Ts,intr to the interior convection module 70 as feedback for subsequent iterations as described above. The surface temperature module 64 is configured to output the determined temperatures Tg and Ts,intr to the cabin air temperature module 62 for determining cabin air temperature as will be described in detail below.

The cabin air temperature module 62 is configured to use the surface temperature estimations from the surface temperature module 64 and to estimate one or more cabin air temperatures based thereon. In the following, the example embodiment, the cabin air temperature is breath level air temperature. However, other cabin temperatures could be estimated including foot level air temperature.

The cabin air temperature module 62 is configured to determine heat flow from the HVAC module 30. The heat flow (Qhvac,fl) from the HVAC module 30 may be determined based on one or more discharge air energy parameters from the HVAC module 30. For example, the discharge air energy parameters may include air flow rate and air temperature. These parameters may be determined by the discharge air energy module 76 using one or more sensors of the HVAC module 30 or by using the HVAC module settings. In an exemplary embodiment, cabin air temperature module uses the following equation to determine heat flow from the HVAC module 30:

$$Q\text{hvac,fl} = m \cdot cp \cdot \delta T$$

where m is the mass of air injected by the climate control system, cp is the specific heat capacity of air and $\delta T$ is the temperature difference between the air injected by the climate control system 32 and cabin interior air, e.g. at occupant's breath-level. The temperature of the cabin interior air used for determining the temperature difference $\delta T$ is obtained from a previous iteration of the present algorithm for determining cabin air temperature. The specific heat capacity of air cp is a constant parameter that may be accessed from the memory 35.

The cabin air temperature module 62 is further configured to determine heat transfer by convection Q_conv,fl between the interior surfaces and air by using the convection heat transfer per unit area Qconv,intr values calculated by the interior convection module 70 and interior surface areas for each surface determined from the physical cabin data module 68. The surface area may be stored in memory 35 and accessed by the physical cabin data module 68.

The cabin air temperature module 62 is configured to estimate cabin air temperature by solving the heat balance equation as described above using the input parameter heat transfer by convection from each surface and heat flow Qhvac,fl from the HVAC module. In particular, the following equation may be utilized to determine net rate of heat transfer or heat flow Q_net,fl to the cabin interior air:

$$Q\text{net,fl} = Q\text{hvac,fl} + Q\_\text{conv,fl}$$

The cabin air temperature module 62 is configured to determine a change of heat energy δQfl in the cabin interior based on the net heat transfer by convection from the interior surfaces of the cabin 14 and the heat transfer from the HVAC module and any heat generated by vehicle occupants Qgenerated,fl. The following equation may be used:

$$\delta Q\text{fl} = Q\text{net,fl} + Q\text{generated,fl}$$

From the change in heat energy δQfl, the cabin air temperature module 62 is configured to calculate a change in cabin air temperature for air in the cabin. For example, the following equation could be used:

$$\delta T = \delta Q/(m \cdot cp) = \delta Q/(\rho \cdot V \cdot cp)$$

where m is the mass of air in the cabin interior in kg $\rho$ is the density of air in kg/m$^3$ and V is the volume of cabin air in m$^3$.

The cabin air temperature module 62 is configured to iterate these calculations to determine the change in cabin air temperature so that an absolute value for cabin air temperature can be determined. The algorithms may be required to be populated with suitable initial values for various parameters in order to iteratively determine cabin temperature. The surface temperature module 64 is also configured to operate iteratively to determine the interior surface temperatures and may also require suitable population with initial values. Similarly, the interior convection module 70 may be configured to iteratively determine the heat transfer values for the interior surfaces and may require suitable population with initial values.

In the foregoing description of the cabin air, surface temperature and interior convection modules 62, 64, 70, the cabin is treated as a whole. However, the calculations can be reformulated, based on the same principles, so that the cabin 14 is divided into a plurality of virtual zones. Heat flow by convection from interior surface within that zone, heat flow by an occupant in that zone and heat flow from the air condition module 30 to that zone may be determined to allow cabin air temperature in each zone to be determined. A suitable cross-talk factor may need to be included, which can be determined by experimentation and stored in memory 35. In this way, the cabin air temperature can be determined in a more localized way. For example, the cabin air temperature for at least one of breath level front right, breath level front left, breath level rear right, breath level rear left, foot level front right, foot level front left, foot level rear right and foot level rear left. The cabin air temperature module 62 may be configured to estimate plural cabin air temperatures, one for each virtual zone. Further, an average cabin air temperature based on the plural zones may be determined.

The cabin air temperature module 62 is configured to output the estimated cabin air temperature, which output may be used as a control input for the automatic climate control system 32 in order to appropriately set the settings of the HVAC module 30 to achieve a desired cabin air temperature. The output may be used for display on the instrument panel 26.

Figure 3:
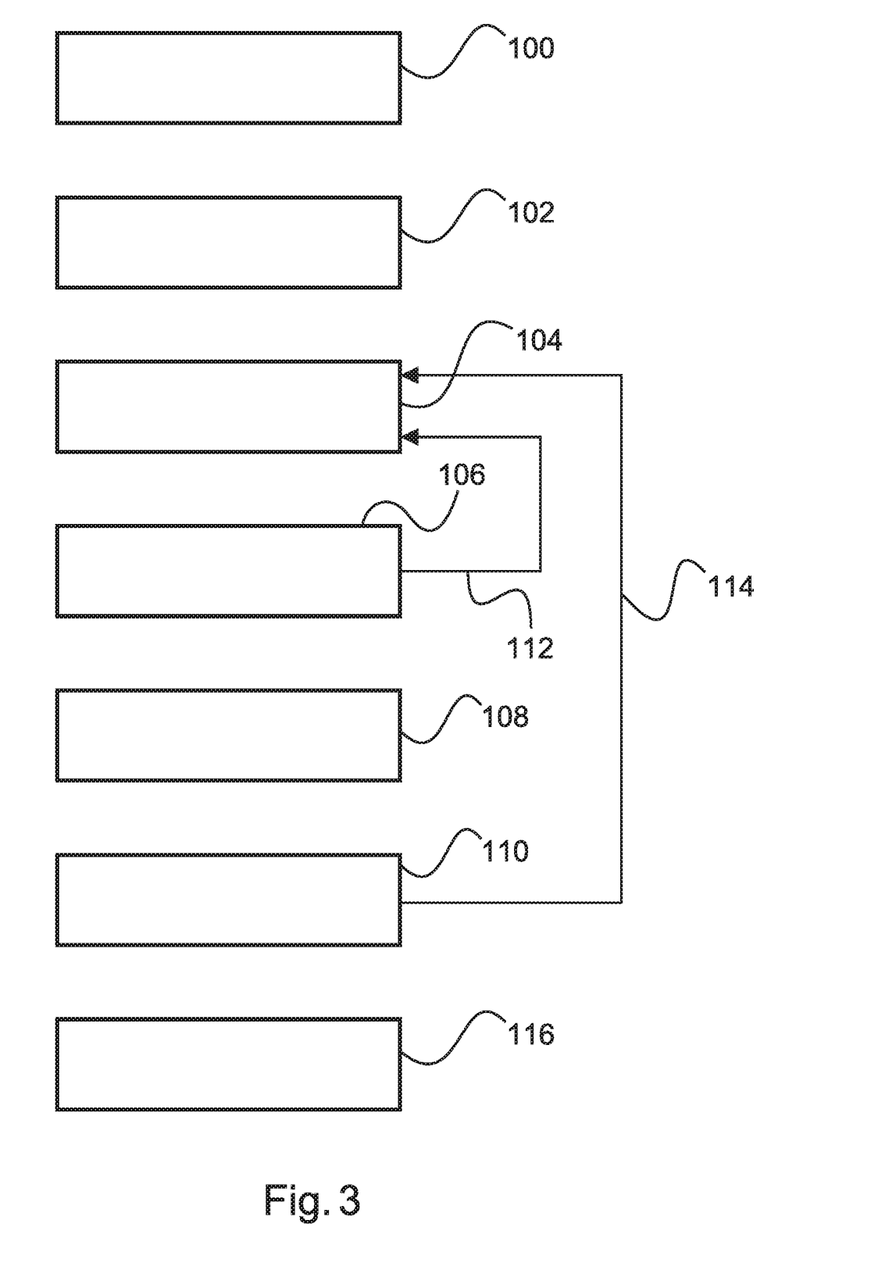
FIG. 3 is a flowchart outlining the steps of an algorithm in accordance with an embodiment.

Referring now to FIG. 3, and with continued reference to FIGS. 1 and 2, a method of estimating the cabin air temperature of a vehicle, and use of the estimated temperature, is shown. The method estimates cabin air temperature based on a model that estimates interior surfaces temperatures for each interior surface of a cabin included in the model based on heat transfer by convection and solar absorption. The model further estimates heat transfer by convection based on previous values for the estimated surface temperature for each interior surface and estimated cabin air temperature and heat transfer coefficient for each interior surface. The method may be implemented by way of a computer program executed by at least one processor, such as the processor 33 of the controller 34 of the air conditioning module 30.

At step 100 of the method of FIG. 3, a surface temperature of at least one first interior surface of the cabin 14 is obtained based on sensor temperature measurements from one or more temperature sensors 37, 40, 42. In one embodiment, the HVAC controller 34 obtains a surface temperature of an interior surface 44 of a body element such as the instrument panel 26 and optionally an interior surface of a window element such as the windscreen 18. Any suitable temperature sensor may be utilized for the one or more temperature sensors.

At step 102, solar absorption is estimated for interior surfaces of the vehicle 12 included in the model. Solar absorption is estimated as described above based at least on solar intensity. Optionally the solar absorption can be further based on angle of solar radiation in combination with optical properties of the surface.

At step 104, heat energy transfer by convection is estimated for each interior surface included in the model. This estimation may be based on heat transfer coefficients for each interior surface and also previous estimates for surface temperature of each interior surface and cabin air temperature. The feedback of estimates of temperature for each interior surface of the cabin 14 as provided by step 106 and an estimate of cabin air temperature as provided by step 110 is shown by lines 112, 114 in FIG. 3. The heat transfer coefficients for each interior surface may be determined from memory 35 in dependence on at least one setting of the air conditioning or HVAC module 30, thereby taking into account a change in heat transfer coefficient depending upon an air distribution mode of the HVAC module 30 and the like.

At step 106, the surface temperatures are estimated of (second) interior surfaces included in the model based on the at least one first interior surface temperature obtained from step 100. In particular, the surface temperature of other interior surfaces of the vehicle are obtained by correlation from the at least one first surface temperature from step 100 which is obtained from a temperature sensor, where the correlation takes into account estimated solar absorption from step 102 and estimated heat transfer by convection from step 104.

At step 108, the effect of the air conditioning or HVAC module 30 on heat transfer is determined. In one embodiment, the cabin air temperature module 62 estimates heat flow from the HVAC module 30 in step 108, which may be based on at least one discharge air energy parameter such as the air flow rate and air temperature. These parameters may be determined using one or more sensors of the HVAC module 30 or by using the HVAC module settings.

At step 110, the cabin air temperate is estimated. In one embodiment, the change of heat energy in the cabin interior is determined based on the net heat transfer by convection as estimated in step 104 from the interior surfaces of the cabin 14 and the heat transfer from the HVAC module 30 as estimated in step 102. The cabin air temperature may also be estimated based on any heat generated by vehicle occupants. From the change of heat energy, a change in cabin air temperature can be determined based on at least one known parameter relating to air in the cabin 14 such as air volume and air mass in the cabin. The change in cabin air temperature allows absolute cabin air temperature to be estimated based on a previous estimate for cabin air temperature.

In step 116, the estimated cabin temperature of the vehicle 12 is used to control at least one feature of a climate control system 32 of the vehicle 12. For example, the cabin air temperature provided by step 110 is utilized as feedback for temperature control of the cabin 14 using the HVAC module 30 or the cabin air temperature is output through the instrument panel 26 such as for viewing by a vehicle occupant or both.

The estimate of heat transfer by convection of step 104 may produce a value on a per unit area basis. In this case, step 110 can estimate the change in cabin air temperature by using the estimate of heat transfer by convection and known surface areas for the cabin interior surfaces stored in memory 35.

The cabin 14 may be split into one or more virtual zones so that cabin air temperature can be separately determined for the one or more virtual zones, particularly such as front right of the cabin 14, where the driver sits.

Using the above described methods to estimate the cabin temperature and then responsively adjusting the HVAC module 30, the desired cabin temperature can be accurately achieved and tracked in real time.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A computer implemented method of controlling a cabin temperature of a vehicle, the method comprising:
   obtaining, via at least one temperature sensor, a surface temperature of at least a first internal surface of a cabin of the vehicle;
   estimating, via a processor and using at least the obtained surface temperature, the heat transfer from the at least one surface to cabin air within the cabin;
   estimating, via a processor and using at least the estimated heat transfer, an estimated cabin temperature of the vehicle; and
   controlling, via a climate control system of the vehicle and using the estimated cabin temperature, the cabin temperature of the vehicle.

2. The method of claim 1, wherein the surface temperature is obtained based on an offset correction of a sensor reading from the temperature sensor.

3. The method of claim 1, comprising estimating, via a processor, a surface temperature of at least one second internal surface of the cabin using at least one of a value of heat transfer by solar radiation and a value of heat transfer by convection for the at least one second internal surface.

4. The method of claim 3, wherein the surface temperature of at least one second internal surface is further estimated using the surface temperature of the at least one first internal surface of the cabin of the vehicle.

5. The method of claim 3, comprising using at least a solar load sensor to estimate the value of heat transfer by solar radiation.

6. The method of claim 3, comprising using at least a known optical property of a window of the vehicle to estimate the value of heat transfer by solar radiation.

7. The method of claim 1, comprising: estimating, via a processor, the surface temperature for each of a plurality of internal surfaces of the cabin of the vehicle including interior surfaces of vehicle glazing and interior surfaces of cabin body elements; estimating, via a processor and using the determined surface for each of the plurality of internal surfaces, the heat transfer from each of the interior surfaces to cabin air within the cabin; and estimating, via a processor and using at least the estimated heat transfer for each of the interior surfaces, the cabin temperature of the vehicle.

8. The method of claim 1, wherein the heat transfer is estimated using one or more heat transfer coefficients for the at least first internal surface and the obtained surface temperature.

9. The method of claim 1, wherein the estimated cabin temperature is estimated using at least a geometry of the cabin and the estimated heat transfer.

10. The method of claim 8, wherein the heat transfer coefficient is retrieved using at least one of vehicle speed and at least one vehicle air conditioning module setting.

11. A computer implemented system for controlling a cabin temperature of a vehicle, the system comprising:
    a non-transitory computer readable medium comprising:
    a first module configured to obtain, via at least one temperature sensor, a surface temperature of at least one internal surface of a cabin of the vehicle;
    a second module configured to estimate, via a processor and using the obtained surface temperature, a heat transfer from the at least one internal surface to cabin air within the cabin;
    a third module configured to estimate, via a processor and using the estimated heat transfer, the cabin temperature of the vehicle; and
    a fourth module configured to, via a processor and using the estimated cabin temperature, control at least one feature of a climate control system of the vehicle.

12. The system of claim 11, wherein the first module is configured to estimate a surface temperature of at least one second internal surface of the cabin using at least one of: a value of heat transfer by solar radiation and a value of heat transfer by convection.

13. The system of claim 12, further comprising a temperature sensor, and wherein the surface temperature of the at least one internal surface is estimated using at least an input from the temperature sensor, and wherein the surface temperature of the at least one second internal surface is estimated using at least one of a value of heat transfer by solar radiation and a value of heat transfer by convection, and the surface temperature of the at least one first internal surface.

14. The system of claim 12, including using a solar load sensor and an optical property of a window of the vehicle to estimate the value of heat transfer by solar radiation.

15. The system of claim 11, wherein the cabin temperature is estimated using at least the estimated heat transfer from the at least one internal surface and heat transfer from a vehicle air conditioning unit of the climate control system.

16. A vehicle adapted to control a temperature of a cabin of the vehicle, the vehicle comprising:
- a temperatures sensor that senses a temperature of a surface within the vehicle;
- a non-transitory computer readable medium comprising:
- a first module configured to, via a processor and using the temperature from at least one temperature sensor, a surface temperature of at least one internal surface of the cabin of the vehicle;
- a second module configured to estimate, via a processor and using the obtained surface temperature, a heat transfer from the at least one internal surface to cabin air within the cabin;
- a third module configured to estimate, via a processor and using the estimated heat transfer, the cabin temperature of the vehicle; and
- a fourth module configured to, via a processor and using the estimated cabin temperature, generate a control signal; and
- a climate control system that is controlled based on the control signals.

17. The vehicle of claim 16, wherein the first module is configured to estimate a surface temperature of at least one second internal surface of the cabin using at least one of: a value of heat transfer by solar radiation and a value of heat transfer by convection.

18. The vehicle of claim 17, wherein the surface temperature of at the least one second internal surface of the cabin is estimated using the surface temperature of the at least one first internal surface.

19. The system of claim 17, further comprising using a solar load sensor and an optical property of a window of the vehicle to estimate the value of heat transfer by solar radiation.

20. The system of claim 16, wherein the cabin temperature is estimated using at least the estimated heat transfer from the at least one internal surface and heat transfer from a vehicle air conditioning unit of the climate control system.

* * * * *